United States Patent [19]

Pomares

[11] Patent Number: 4,758,930
[45] Date of Patent: Jul. 19, 1988

[54] LUMINOUS ENERGY TRANSMITTER DEVICE

[76] Inventor: Jaime S. Pomares, P. Velazquez 9, 03004 Alicante, Spain

[21] Appl. No.: 922,861

[22] Filed: Oct. 24, 1986

[30] Foreign Application Priority Data

Oct. 28, 1985 [ES] Spain .................................... 289896
Jun. 17, 1986 [ES] Spain .................................... 294823
Oct. 17, 1986 [ES] Spain .................................... 8602661

[51] Int. Cl.⁴ .............................................. F21V 7/04
[52] U.S. Cl. ............................................ 362/32; 362/1
[58] Field of Search ................... 362/32, 1; 126/417, 126/438, 440, 451; 350/258, 265

[56] References Cited

U.S. PATENT DOCUMENTS

| | | | |
|---|---|---|---|
| 3,881,976 | 5/1975 | Jones | 362/32 X |
| 4,152,752 | 5/1979 | Niemi | 362/32 |
| 4,297,000 | 10/1981 | Fries | 362/32 X |
| 4,363,080 | 12/1982 | Sylvester | 362/32 |
| 4,394,860 | 7/1983 | Smith | 362/147 X |
| 4,411,490 | 10/1983 | Daniel | 362/32 |
| 4,459,643 | 7/1984 | Mori | 362/32 |
| 4,539,625 | 9/1985 | Bornstein et al. | 362/32 |

Primary Examiner—Larry Jones
Attorney, Agent, or Firm—Ladas & Parry

[57] ABSTRACT

A luminous energy transmission device, which uses individual wave-guide light conductors, wherein one end of the light conductors meets in a single catchment collector of a focus of electromagnetic waves of wavelength between 400 and 700 nm. The opposite ends of the light conductors flow into individual multi-directional diffuser elements made up of solid, internally microfissured transparent resin or glue and molded into optical emission shapes.

6 Claims, 3 Drawing Sheets

LUMINOUS ENERGY TRANSMITTER DEVICE

The invention refers to a luminous energy transmitter device which, in addition incorporates a transducer medium for the said transmitted energy.

By means of the device proposed, it is possible to light simultaneously multiple places or premises, using as energy source natural sunlight itself or else a light focus activated by electrical power, or on a mixed basis, applied to a single catchment element for each energy system.

The light energy, transmitted in electromagnetic waves between wavelengths of 400 to 700 nanometers, is conducted from the catchment or concentrator element to the multiple points to be lit by means of light conductors whose outlet, controlled by a diaphgram or individual luminosity control, projects the light energy transmitted to one or more diffuser emitters which, modifying the rectilinear emission of the light conducted in several directions by internal deflection, transforms it directly in focal outlets without auxiliary parabolic reflectors, in turn avoiding localised outlets.

The combined use of natural light and electric light is controlled in the second variant by a light regulator which is operated by a photo-sensitive transducer; moreover, the heat produced in this concentrating catchment element is utilised, by means of a heat exchanger for water or hot air which, for its part, cools it.

The said luminous energy transmitted with focal outlets, can be radially diffused; in other words, by means of a focal light energy transducer, it can be converted or projected radially, so that the said transducer will essentially be made up of a bulb whose glass has been treated in composition with diffuser material, and which can be functionally coupled to the outlet of each of the multiple light wavelength conductors, in order to modify the focal emission at the outlet thereof in radial emission, so ensuring diffusion of a high level of effectiveness.

In summary, the light focus produced by a luminaire or the light of the sun is transported by means of optic wave-guide conductors between lengths of 400 to 700 nanometers of the visible spectrum. The light which is applied to the end of the conductor or set of conductors, emerges from the opposite end or ends in the form of a focus ready to illuminate objects, without repairing the incorporation of any type of reflective parabola.

The focus opening is between 15 and 120 degrees, made possible thanks to the incorporation at the ends of each conductor of solid fissured transparent resins or glues which order the light outlet in the form of a focus without the use of reflector elements.

Therefore, several light foci are obtained from a single luminaire. The flexibility of the assembly made up by beams from fine luminous wave-guide conductors makes it possible to direct them individually as required, so that the foci allow the illumination of separate spaces, in theatres, monuments, paintings, objects in ship-windows, cabarets, automobile headlights, vessels, aircraft and, in general, in any place where illumination is required in focal form, in all cases eliminating the reflecting parabolas normally used. The invention reduces the space taken up by reflective parabolas and their consumption of energy as they convert it into heat.

The light emerging from each of the foci is free of infra-red radiation from wavelengths of 800 nanometres upwards, so that heat is greatly reduced.

Greater light yield is obtained without damaging the products to be illuminated by the heat from the light focus, eliminating risk of fire from heat dissipation or from short-circuits. The light conductors do not carry electrical power so that they can be handled without risk of burning or electrocution and the light focus can even be place in water without any protection whatsoever.

The transmitter device and the transducer incorporated into it, along with a variety of examples of application, will be described with the aid of drawings showing, by way of illustration and without limitation, a simple practical design of the invention, so that any variations in dimensions, materials and proportions must be deemed to fall within the scope of the protection of the invention, as long as they do not modify its essential nature, so giving rise to a new and different industrial result.

Figure 1:
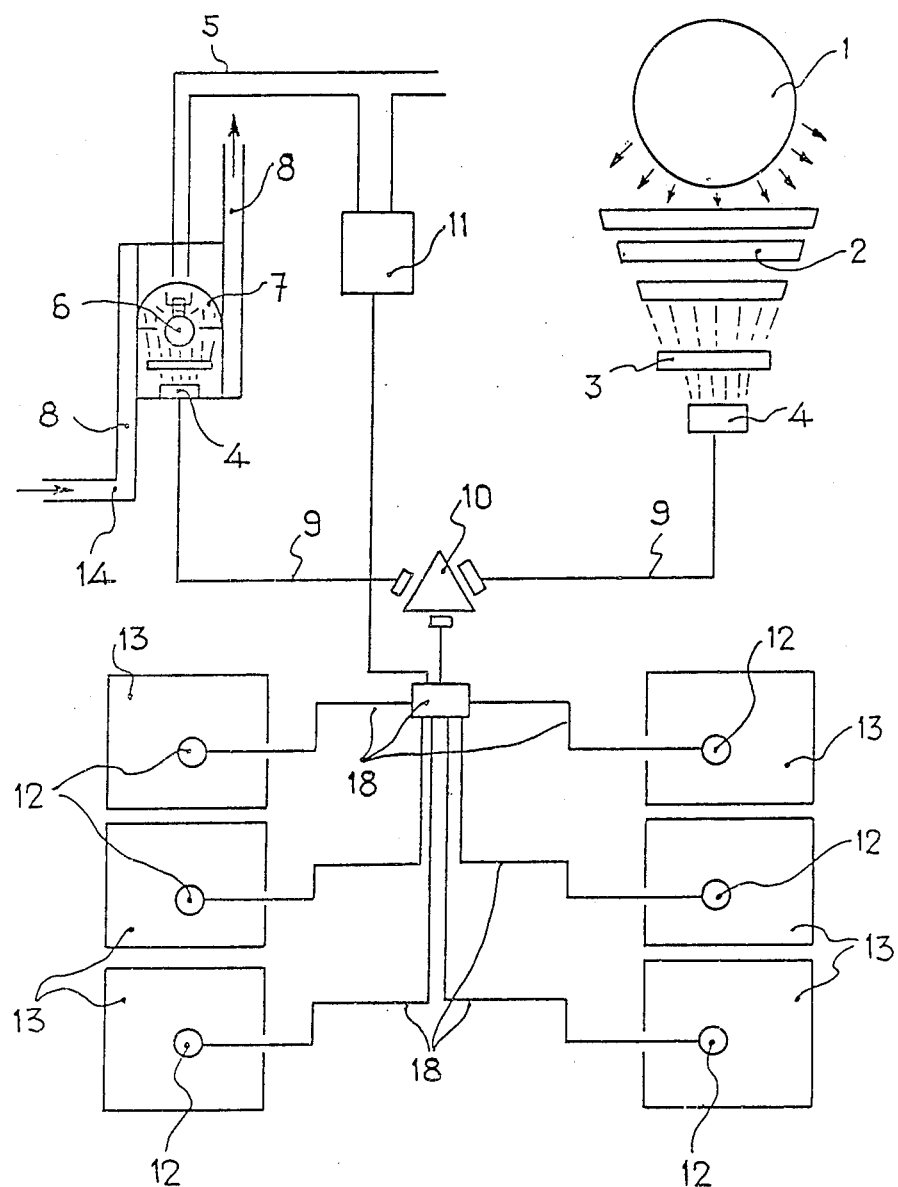
FIG. 1 shows a scheme, in the form of a block diagram, of an installation for the transmission of energy constituting the device designed in accordance with the invention.
Figure 2:
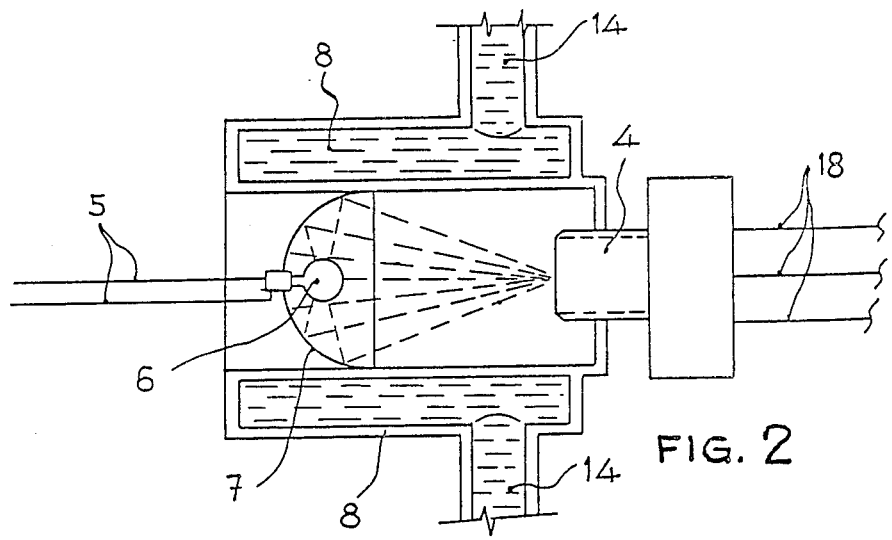
FIG. 2 shows a longitudinal cross-section view of the catchment element or cell with an electrical power emitter and cooler exchanger surround.
Figure 3:
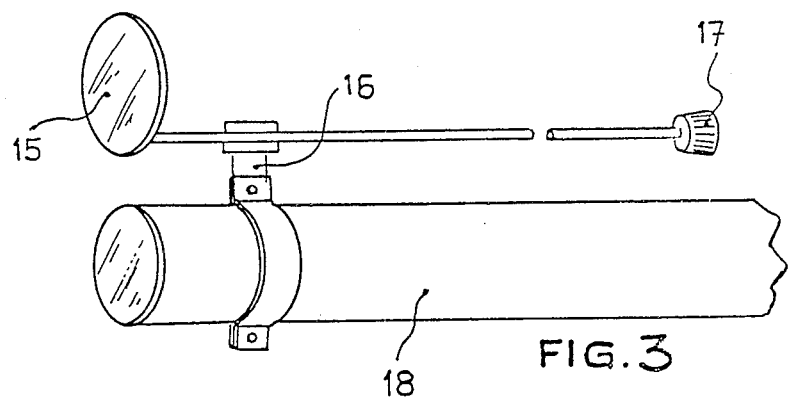
FIG. 3 shows a partial perspective view of one end of an emitter conductor fitted with a control diaphragm or regulator.
Figure 4:
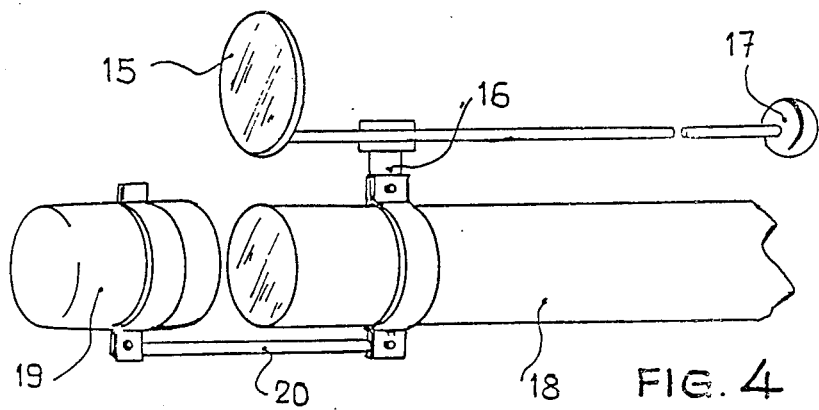
FIG. 4 shows a diagrammatic view of the transducer incorporated on the end of the emitter conductor which is shown in the previous figure.

In relation with the said drawings and on the base thereof, the device in this invention operates as follows:

Natural sunlight (1) waves are concentrated by the light concentration element (2), aligned by means of the lens (3) and beamed to the catchment unit (4), prism (10) collector (9) and the conductors (18), and to the individual diffuser elements (12), the emission being controlled by the diaphragm (15) fitted on the mount (16) and operated by the control (17).

If natural light is insufficient, the electrical luminosity regulator (11) operates on the electrical conductors (5), switching on the luminous focus (6), the light from which is concentrated by the parabola (7) into the captador itself (4), then conducted as in the case of emission with natural light.

The light emitted in the form described is projected simultaneously to the places or enclosures to be illuminated (13), as shown in FIG. 1.

On the other hand, the heat which is generated by the electrical light focus or element (6) is absorbed by means of a heat exchanger which (8) conducts it to an energy utilisation line; the said exchanger (8) has a coolant fluid (14).

Finally, on the end of the wave-guide conductor (18) it is possible to fit a transducer made up of a radial/focal outlet converter (19), the said transducer (19) being fitted on a focus arm (20). As has been pointed out, this transducer makes it possible to convert the focal outlet into a radial emission.

Figure 5:
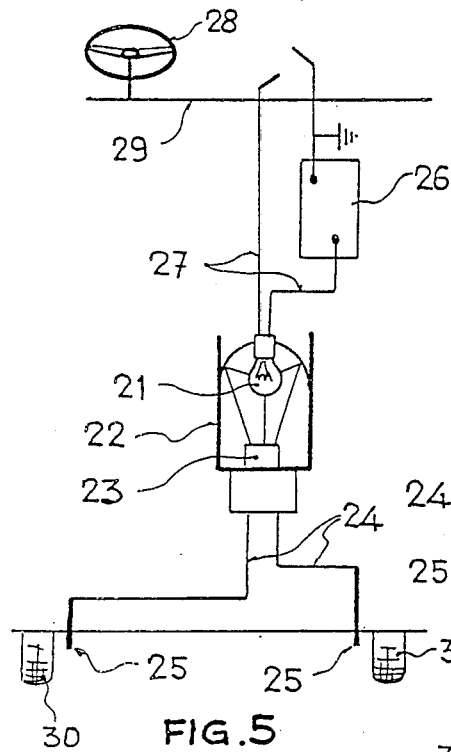
FIGS. 5 to 8 show diagrammatic views of examples of application.

FIG. 5 shows a diagrammatic view of a form of application of the illumination system of the invention on a motor vehicle. The figure shows a luminaire (21) or electric lamp which emits the associated light inside a metal casing (22) in which a light collector has been provided (23) and from which the said light is carried by wave-guide conductors (23) at whose outlet they form light foci (25) for the illumination (in the case of a vehicle, headlights without reflecting parabolas). In the said figure, a battery (26) or electrical power source can be seen, along with the cables (27) for the supply to the lamp (21), and the steering wheel (28), splashguard (29) and wheels (30) of a motor vehicle, all shown in a completely diagrammatic form.

Figure 6:
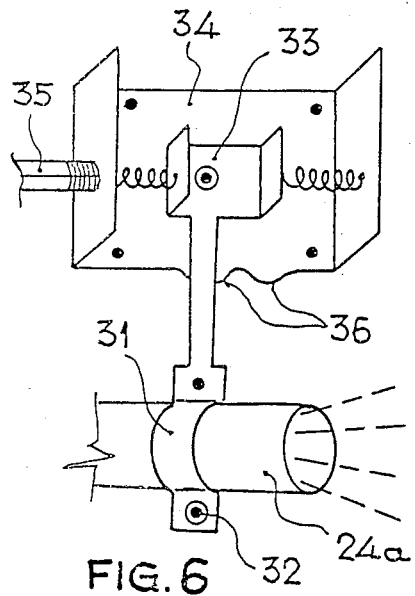

FIG. 6 also shows a diagrammatic view of the system in its application on an automobile in such a way as to make it possible to change the lights from high to low beam. In the said figure, the light conductor (24a) is secured by a clamp (31) with a through bolt (32). The said clamp (31) is extended into an arm so as to produce a sliding part (33) at the opposite end for the change of the lights, the said sliding part being controlled at will by a cable (35) and attached to a general mount (34) for the securing of the assembly, and on which the positioning devices (36) are defined for the low and high beam vehicle lights.

Figure 7:
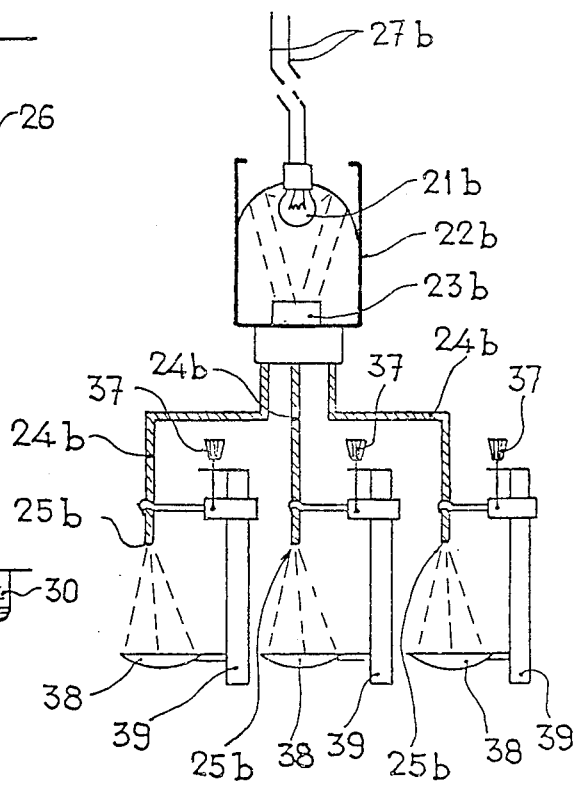

FIG. 7 shows a further example of application, with a light bulb (21b) inside a housing (22b) in which, in turn, a light catchment unit (23b) is laid out. The said bulb (21b) is fed from the cables (27b) and the light which it emits reaches the wave-guide conductors (24b) whose outlets each form light foci (25b) each associated with control buttons (37) which allow them to be regulated axially and project the light towards long-distance focus lenses (38) The said control buttons (37) are fited on mounts (39).

Figure 8:
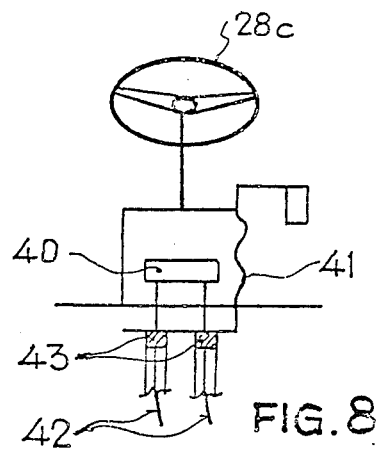

Finally, FIG. 8 shows another diagrammatic view of the application of the system on a vehicle, fitted with devices for adjusting the inclination of the light foci. In the said figure, the steering wheel (28c) of the vehicle can be seen, along with the light change control (40), the mount (41), the traction cables (42) for inclining the foci, and the cable regulator terminals (43).

I claim:

1. A lighting system comprising a means for collecting sunlight;
   an artificial light source;
   a means for collecting light from the artificial light source;
   means for conducting said sunlight and said artificial light to a prism;
   a bundle of a plurality of optical light conductors having one end adjacent to the prism for conducting the combined sunlight and artificial light from the prism, the other end of the optical light conductors in the bundle each having a solid light diffuser element for diffusing and the light conducted from the optical light conductors, said light diffuser element being formed from a transparent material selected from the group consisting of resin and glue, the transparent material having internal microfissures.

2. The lighting system of claim 1, further comprises a means for regulating the amount of illumination emitted by the artificial light source relative to the amount of illumination from the sunlight.

3. The lighting system of claim 1, wherein the artificial light source further comprises a reflector for concentrating the light from the artificial light source onto the means for collecting light from the artificial light source, and means for cooling the artificial light source.

4. The light system of claim 1, at least one of said optical fiber diffuser element further comprises a shutter mechanism for blocking at least a portion of the light exiting the optical light conductor diffuser element.

5. The lighting system of claim 1, wherein at least one of said optical light conductor diffuser element further comprises at least one lens mounted for axial movement relative to the optical light conductor diffuser element for radially diffusing the light exiting from the optical light conductor diffuser element.

6. A lighting system comprising:
   a prism;
   a bundled plurality of optical light conductors having a first end and a second end, said first end lying adjacent said prism to conduct light passing through said prism;
   a light diffuser associated with said second end, said diffuser being formed from a transparent material selected from the group consisting of resin and glue and having internal microfissures which order the light outlet in the form of a focus without making use of reflective elements.

* * * * *